United States Patent
Yamazaki

(10) Patent No.: US 7,263,463 B2
(45) Date of Patent: Aug. 28, 2007

(54) PREDICTION APPARATUS AND METHOD FOR A PLASMA PROCESSING APPARATUS

(75) Inventor: Yoshihiro Yamazaki, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 224 days.

(21) Appl. No.: 10/841,570

(22) Filed: May 10, 2004

(65) Prior Publication Data

US 2005/0004683 A1 Jan. 6, 2005

(30) Foreign Application Priority Data

May 9, 2003 (JP) .............................. 2003-131463

(51) Int. Cl.
   *G06F 11/30* (2006.01)
   *G06F 15/00* (2006.01)
(52) U.S. Cl. ..................... 702/182; 702/183
(58) Field of Classification Search ............... 702/182, 702/183, 188; 700/30, 52, 53, 108, 121; 356/316, 326; 438/14
See application file for complete search history.

(56) References Cited

U.S. PATENT DOCUMENTS

2004/0007560 A1   1/2004   Sakano et al.
2004/0181299 A1*  9/2004   Yamazaki et al. ............ 700/44
2004/0254761 A1* 12/2004   Sakano et al. .............. 702/182

OTHER PUBLICATIONS

Journal of Chemometrics, vol. 2, pp. 211-228 (1988).

* cited by examiner

*Primary Examiner*—Bryan Bui
(74) *Attorney, Agent, or Firm*—Finnegan, Henderson, Farabow, Garrett & Dunner, L.L.P.

(57) ABSTRACT

Data used for prediction is selected based on multivariate analysis, and thereby, prediction accuracy is improved. Operation data obtained every wafer processing and processing result data such as thickness of top electrode are stored (collected) in operation data storage sections 202 and a processing result data storage sections and 204, respectively. An analysis processing section 208 makes multivariate analysis with respect to the collected operation data, and thereafter, data used for prediction is selected based on the multivariate analysis. A correlation between the selected operation data and processing result data is found. Based on the correlation, a condition of the plasma processing apparatus or state of an object to be processed as the processing result using operation data when processing wafers other than wafers used for obtaining the correlation.

14 Claims, 9 Drawing Sheets

FIG.3

| PARAMETER | FIRST PRINCIPAL COMPONENT (P1) | SECOND PRINCIPAL COMPONENT (P2) | PARAMETER | FIRST PRINCIPAL COMPONENT (P1) | SECOND PRINCIPAL COMPONENT (P2) |
|---|---|---|---|---|---|
| I_2 | 0.188123 | -0.0569484 | V_2 | -0.188932 | -0.0113565 |
| I_4 | 0.173236 | 0.0380891 | V_4 | -0.185121 | -0.0635713 |
| I_6 | 0.144744 | -0.246086 | V_6 | -0.189334 | -0.02417 |
| I_8 | -0.185186 | 0.0600322 | V_8 | 0.185192 | -0.0844738 |
| I_10 | -0.171909 | -0.1675 | V_10 | -0.188507 | -0.0314914 |
| I_12 | -0.166774 | 0.0448353 | V_12 | -0.156147 | -0.222074 |
| I_14 | 0.0458469 | 0.0965937 | V_14 | 0.189662 | -0.000989 |
| I_20 | 0.187485 | 0.0414917 | V_20 | 0.187088 | 0.0431497 |
| I_40 | -0.18015 | -0.112628 | V_40 | -0.094656 | -0.345394 |
| P_2 | 0.184909 | 0.0852228 | Z_2 | -0.189312 | 0.00599287 |
| P_4 | -0.178928 | 0.13728 | Z_4 | -0.186485 | -0.0521488 |
| P_6 | 0.0599411 | 0.381683 | Z_6 | -0.189562 | 0.0219022 |
| P_8 | -0.163391 | 0.208892 | Z_8 | 0.184723 | 0.00486943 |
| P_10 | 0.175499 | -0.157592 | Z_10 | 0.0140042 | 0.403355 |
| P_12 | -0.170577 | 0.180173 | Z_12 | 0.158482 | -0.186632 |
| P_14 | 0.130519 | -0.240752 | Z_14 | 0.17991 | 0.0751783 |
| P_20 | 0.177688 | -0.0958494 | Z_20 | -0.185744 | -0.05493 |
| P_40 | -0.177558 | -0.0823548 | Z_40 | -0.0542426 | -0.371312 |

PREDICTION APPARATUS AND METHOD FOR A PLASMA PROCESSING APPARATUS

BACKGROUND OF THE INVENTION

1. Field of the Invention

The present invention relates to prediction apparatus and method for a plasma processing apparatus, which predicts a state of process materials such as wafer processed in apparatuses for manufacturing semiconductors and the apparatus condition.

2. Description of the Related Art

Various processing apparatuses are used in the process of manufacturing semiconductors. For example, a processing apparatus such as plasma process apparatus is widely used in the process of depositing and etching objects to be processed such as semiconductor wafer and glass substrate. The plasma processing apparatus generates plasma using a process gas introduced in a hermetic process chamber. Thereafter, the apparatus carries out plasma processing with respect to objects to be processed, for example, the surface of semiconductor wafer. The forgoing plasma processing is repeated, and thereby, reactive products by plasma are generated, and thereafter, adhere to the inner wall of a process chamber. In addition, parts such as electrode provided in the process chamber are consumed. As a result, the apparatus condition subtly changes. The change of the apparatus condition gives influence to the etching shape of wafer. For this reason, the following parameters must be monitored in order to always carry out stable process. One of the parameters is the apparatus condition, that is, the thickness of parts provided in the process chamber. Another is the process result including process characteristic such as shape data of plasma-processed wafer.

For example, a test wafer is prepared, and thereafter, etching is periodically carried out with respect to the prepared test wafer. The condition of the processing apparatus is repeatedly determined based on the processing result (e.g., etched amount of the test wafer).

However, if the condition of the processing apparatus is repeatedly determined based on the test wafer, many test wafers must be prepared. In addition, there is a need of measuring the processing result every when many test wafers are processed using the processing apparatus. For this reason, the problem described below. That is, many processes and much time are taken to prepare the test wafers and to measure the processing result.

According to the technique (prediction method) disclosed in the following U.S. Patent Publication No. 2004-0007560, electrical data such as voltage and current of fundamental wave or integer multiple wave of a high frequency power source are agedly measured. Multiple regression analysis is made using the measurement data to prepare a predictive model, and thereafter, the thickness of a focus ring is predicted based on the predictive model.

The prediction method described above is excellent in prediction of the apparatus condition such as the thickness of the focus ring, however, the following case exists. Measurement data used when actually preparing the predictive model is not sufficient to carry out high accurate prediction, therefore, further improvement is required.

For example, in data used when actually preparing a model expression, there exists data contributing to a tendency of worsening a predicted value with respect to an observed value. In such a case, if data are all used without selecting the data used when preparing a model expression, correct prediction result is not conversely obtained.

The present invention has been made in view of the circumstances described above. Therefore, an object of the present invention is to provide prediction apparatus and method for a plasma process apparatus, which select data used for prediction based on multivariate analysis to improve prediction accuracy.

SUMMARY OF THE INVENTION

In order to solve the foregoing problem, according to a first aspect of the present invention, there is provided a prediction apparatus for a plasma processing apparatus, which predicts a condition of the plasma processing apparatus or state of an object to be processed based on an operation data of the plasma processing apparatus and a processing result data acquiring the condition of the plasma processing apparatus or state of the object to be processed as processing result in a process of carrying out plasma processing with respect to the object to be processed in a process chamber of the plasma processing apparatus, comprising:

data collect means for collecting an operating data and the processing result data;

operation data selecting means for making multivariate analysis with respect to the collected operation data, and selecting the operation data used for prediction based on the analysis result;

analysis means for finding a correlation between the selected operation data and the processing result data; and prediction means for predicting a condition of the plasma processing apparatus or state of the object to be processed using an operation data when objects to be pressed other than the object to be processed used for obtaining the correlation are processed, based on the correlation found by the analysis means.

In order to solve the foregoing problem, according to a second aspect of the present invention, there is provided a prediction method for a plasma processing apparatus, which predicts a condition of the plasma processing apparatus or state of an object to be processed based on an operation data of the plasma processing apparatus and a processing result data acquiring the condition of the plasma processing apparatus or state of the object to be processed as processing result in a process of carrying out plasma processing with respect to the object to be processed in a process chamber of the plasma processing apparatus, comprising:

a data collecting step of collecting an operating data and the processing result data;

an operation data selecting step of making multivariate analysis with respect to the collected operation data, and selecting the operation data used for prediction based on the analysis result;

an analysis step of finding a correction between the selected operation data and the processing result data; and a prediction step of predicting a condition of the plasma processing apparatus or state of the object to be processed using an operation data when objects to be processed other than the object to be processed used for obtaining the correlation are processed, based on the correlation found by the analysis step.

According to the first and second aspects of the present invention, the condition of the plasma processing apparatus or state of the object to be processed is predicted using operation data selected based on the multivariate analysis result selected from collected operation data. Thus, prediction is carried out in a manner of reducing the operation data without using operation data giving bad influence to the prediction result. By doing so, the prediction accuracy is improved.

In the prediction apparatus and method, the operation data selecting means or step makes a principal component analysis with respect to the collected operation data, and thereafter, selects the operation data based a relative contribution of the initial operation data relevant to each principal component axis obtained from the principal component analysis. In this case, the relative contribution of the initial operation data relevant to each principal component axis is loading relevant to each operation data. An operation data corresponding to loading within a predetermined distance range from each principal component axis is selected.

As described above, principal component analysis is made with respect to the collected operation data. For example, the operation data corresponding to loading within a predetermined distance range from each principal component axis is selected. By doing so, it is possible to select the optimum operation data expressing the features of the operation data among the collected operation data. By doing so, unnecessary operation data given as noise is removed when prediction is carried out, therefore, prediction accuracy is improved.

In the prediction apparatus and method, the predetermined distance range from each principal component axis is gradually shortened so that prediction is carried out based on an operation data selected in each predetermined distance range. A distance from each principal component axis is set so that the best prediction result is obtained, and thereafter, the operation data is selected. By doing so, the optimum operation data used for prediction is selected.

In the prediction apparatus and method, the analysis means or step finds the correlation using a partial least squares method. By doing so, a correlation between the operation data and the processing result data is found using less calculation.

In the prediction apparatus and method, the operation data includes at least electrical data of a harmonic wave based on plasma generated in the process chamber. The processing result data is data relevant to consumption of parts arranged in the process chamber (e.g., data relevant to a thickness of an electrode arranged in the process chamber).

In the following description, 1 m Torr is set as $(10^{-3} \times 101325/760)$ Pa, and 1 sccm is set as $(10^{-6}/60)\text{m}^3/\text{sec}$.

BRIEF DESCRIPTION OF THE DRAWINGS

FIG. 3 is a table showing each parameter loading values of electrical data in the embodiment;

DETAILED DESCRIPTION OF THE PREFERRED EMBODIMENTS

Figure 1:
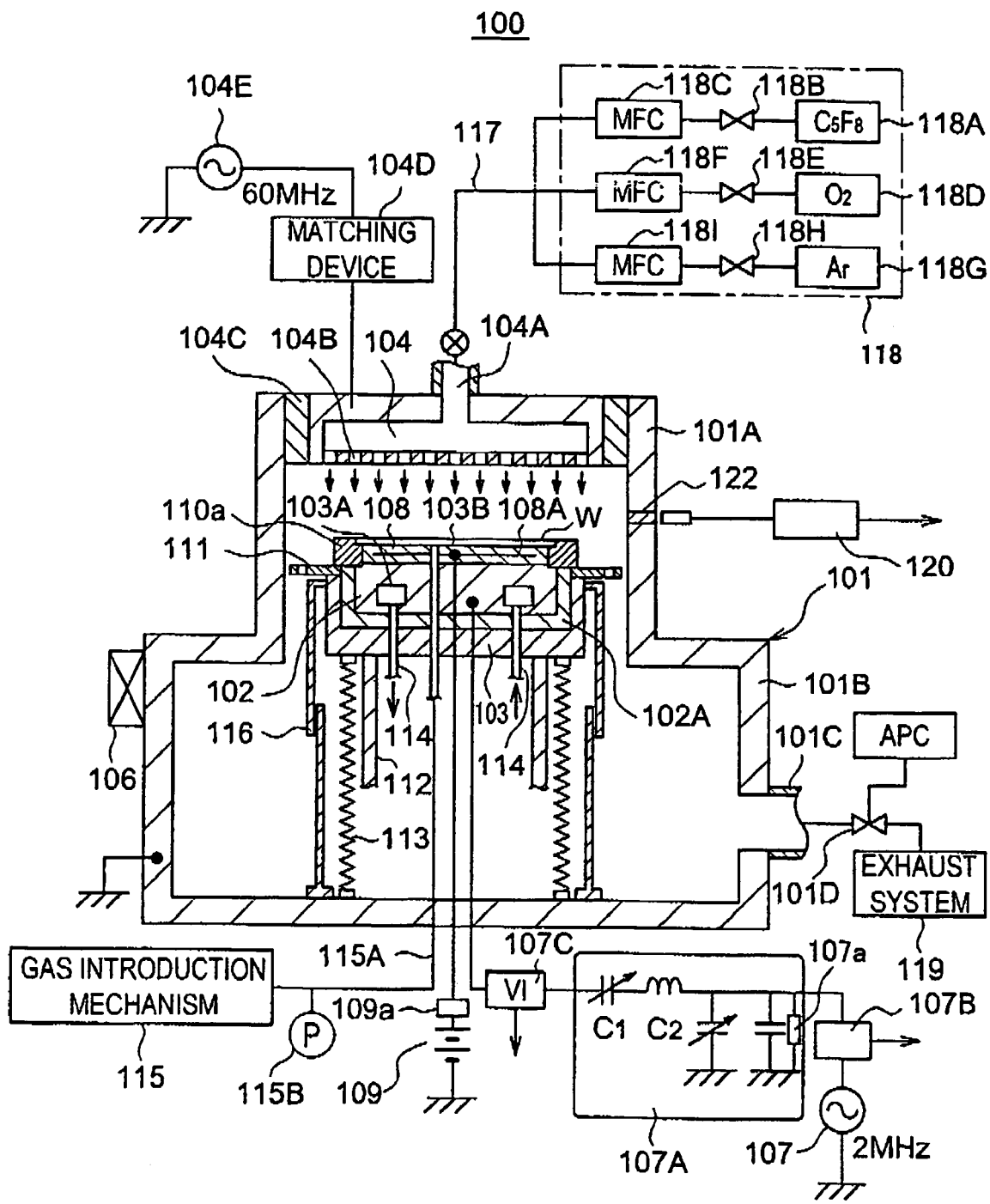
FIG. 1 is a cross-sectional view showing a plasma processing apparatus according to one embodiment of the present invention.

The preferred embodiment of prediction apparatus and method for a plasma processing apparatus according to the present invention will be described below with reference to the accompanying drawings. In the following description and drawings, the same reference numerals are used to designate components having substantially identical function and configuration. The overlapping explanation is omitted.

(Plasma Processing Apparatus)

First, a parallel flat type plasma etching apparatus (hereinafter, referred to as plasma process apparatus 100) will be described as the plasma processing apparatus according to the first embodiment. The plasma processing apparatus 100 includes aluminum chamber 101, vertically movable aluminum support member 103, and shower head (hereinafter, referred to as top electrode) 104, for example, as shown in FIG. 1. The support member 103 supports a bottom electrode 102 arranged in the process chamber 101 via an insulating member (insulator) 102A. The shower head 104, that is, top electrode 104 is arranged above the support member 103, and supplies process gas. The top electrode 104 is insulated from the process chamber 101 via an insulating member 104C.

The top electrode 104 is connected with a first high frequency power source 104E, and a matching device 104D is inserted in the feeder between the source and the top electrode. The first high frequency power source 104E has a frequency ranging from 50 to 150 MHz. The high frequency power is applied, and thereby, high-density plasma is formed in the process chamber 101 in a preferable dissociated state. Therefore, plasma processing is possible under the low-pressure condition as compared with the conventional case. It is preferable that the frequency of the first high frequency power source 104E rages from 50 to 80 MHz. Typically, frequency of 60 MHz shown in FIG. 1 or near thereto is employed.

The side wall of the process chamber 101 is provided with a detection window 122. A spectrometer (hereinafter, referred to as optical measurement device) 120 is located outside the side wall of the process chamber 101 via the detection window 122. The optical measurement device 120 detects plasma emission in the process chamber 101. Emission spectrum strength of a wavelength detected by the optical measuring device 120 is usable, for example, as optical data.

The process chamber 101 is composed of upper and lower portions, and the upper potion is formed as a small-diameter upper chamber 101A while the lower portion is formed as a large-diameter lower chamber 101B. The upper portion of the lower chamber 101B is formed with an in-and-out port for carrying in and out a wafer W. The port is attached with a gate valve 106.

The bottom electrode 102 is connected with a second high frequency power source 107 via electric measurement device (e.g., VI probe) 107C, matching device 107A and wattmeter 107B. The second high frequency power source 107 has a frequency ranging several hundreds of kHz to several tens of MHz. The frequency having the forgoing range is applied, and thereby, ion is properly effected without giving damage to the object to be processed, that is, wafer W. Typically, 2 MHz and the like shown in FIG. 1 is employed as the frequency of the second high frequency power source 107.

The matching device 107A includes a measurement device (not shown) for measuring a high frequency (RF) voltage Vpp on the side of the bottom electrode 102 (high frequency voltage output). More specifically, the matching device 107A includes, for example, two variable capacitors C1, C2, capacitor C3 and coil L, and makes impedance matching via the variable capacitors C1 and C2.

The matching device 107A further includes a voltmeter 107a. The voltmeter 107a can measure a voltage Vdc between the supply line (electric cable) of the second high frequency power source and a ground of the plasma processing apparatus 100.

The wattmeter 107B connected to the bottom electrode 102 (high frequency power output) of the matching device 107A measures a second high frequency power P from the second high frequency power source 107.

The following parameters are detected as electrical data from the high frequency power P applied to the bottom else 102 via the wattmeter (e.g., VI probe) 107C. The parameter is fundamental wave (e.g., traveling and reflection waves of high frequency power based on plasma generated in the upper chamber 101A. In addition, the parameter is high frequency voltage (V) in higher harmonic, high frequency current (I), high frequency phase (P) and impedance (Z). In the embodiment, the foregoing electrical data such as fundamental wave, harmonic voltage (V) in higher harmonic, current (I), phase (P) and impedance (Z) are used for prediction as operation data.

The upper surface of the bottom electrode 102 is provided with an electrostatic chuck 108. An electrode plate 108A of the electrostatic chuck 108 is connected with a direct current source 109. High voltage is applied to the electrode plate 108A from the direct current source 109 under high vacuum condition, and thereby, the electrostatic chuck 108 electrostatically chucks the wafer. A wattmeter 109a is connected between the electrode plate 108A of the electrostatic chuck 108 and the current source 109. The wattmeter 109a detects applied current and voltage of the electrostatic chuck 108.

The outer periphery of the bottom electrode 102 is provided with a focus ring 110a for collecting plasma generated in the upper chamber 101A to the wafer W. The lower side of the focus ring 110a is provided with an exhaust ring 111 attached to the upper portion of the support member 103. The exhaust ring 111 is formed with several holes over the entire periphery at equal intervals in the circumferential direction. Gas in the upper chamber 101A is exhausted to the lower chamber 101B via these holes.

The support member 103 is vertically movable between the upper and lower chambers 101A and 101B via ball screw mechanism 112 and bellows 113. When the wafer W is supplied onto the bottom electrode 102, the bottom electrode 102 moves down to the lower chamber 101B via the support member 103. The gate valve 106 is released, and thereafter, the wafer W is supplied onto the bottom electrode 102 via carry mechanism (not shown).

The support member 103 is formed with a cooling medium flow passage 103A connected to a cooling medium pipe 114. The cooling media is circulated in the cooling medium flow passage 103A via the cooling medium pipe 114 to control the wafer W to predetermined temperature.

The foregoing support member 103, insulating member 102A, bottom electrode 102 and electrostatic chuck 108 are formed with a gas flow passage 103B, respectively. For example, He gas is supplied as backside gas from the gas introduction mechanism 115 to a slit gap between the electrostatic chuck 108 and the wafer W via a gas pipe 115A under predetermined pressure. By doing so, heat conduction between the electrostatic chuck 108 and the wafer W is enhanced via the He gas. A pressure sensor (not shown) detects the pressure of the backside gas, and thereafter, the detected value is displayed on a pressure indicator 115B. In FIG. 1, a reference numeral 116 denotes a bellows cover. The gas introduction mechanism 115 is provided with, for example, a mass flow controller (not shown). The mass flow controller detects a gas flow rate of the backside gas.

The upper surface of the top electrode 104 is formed with a gas introduction port 104A. The gas introduction port 104A is connected with a process gas supply system 118 via a pipe 117. The process gas supply system 118 includes $C_5F_8$ gas supply source 118A, $O_2$ gas supply source 118D and Ar gas supply source 118G.

These gas supply sources 118A, 118D and 118G supply their gases to the top electrode 104 with a predetermined flow rate via valves 118B, 118E and 118H and mass flow controllers 118C, 118F and 118I, respectively. These gas supply sources controls the gas as a mid gas having a predetermined compound ratio. The lower surface of the top electrode 104 is formed with several holes 104B over the entire surface at equal intervals. The mixed gas is supplied as process gas from the top electrode 104 into the upper chamber 101A via these holes 104B.

In FIG. 1, a reference numeral 101C denotes an exhaust pipe, and 119 denotes an exhaust system comprising a vacuum pump connected to the exhaust pipe 101C. The exhaust pipe 101C is provided with an APC (Auto Pressure Controller) valve 101D. The opening ratio of the APC valve is automatically controlled in accordance with a gas pressure of the process chamber 101.

(Multivariate Analyzer)

Figure 2:
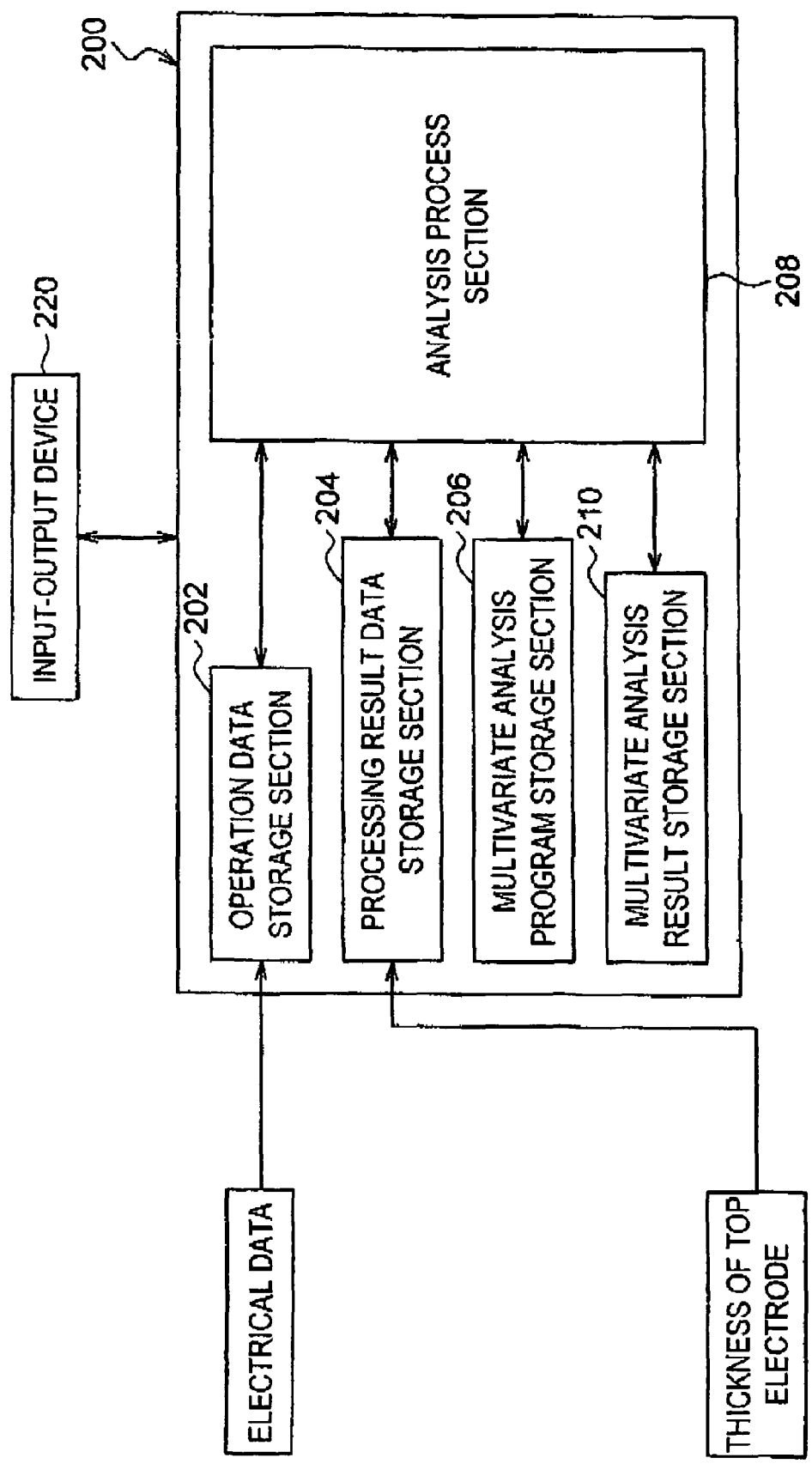
FIG. 2 is a block diagram showing the configuration of a multivariate analyzer in the embodiment.

The plasma processing apparatus 100 includes a multivariate analyzer 200 and an input-output device 220, for example, as shown in FIG. 2. The multivariate analyzer 200 statistically analyze operation data and processing result data (e.g., apparatus condition data such as thickness of top electrode 104, process characteristic data such as etching shape data of processed wafer). The input-output device 220 inputs the processing result data while outputting information such as analysis result. The plasma processing apparatus 100 makes multivariate analysis of the operation data and the processing result data via the multivariate analyzer 200 to find a correlation between the foregoing both data. Thereafter, the plasma processing apparatus 100 outputs information such as analysis result via the input-output device 220, as the need arises.

The multivariate analyzer 200 includes operation data storage section 202, processing result data storage section 204, multivariate analysis program storage section 206, analysis processing section 208 and multivariate analysis result storage section 210.

The operation data storage section 202 constitutes means for storing operation data, and the processing result data storage section 204 constitutes means for storing processing result data. The analysis processing section 208 constitutes means for finding a correlation (e.g., prediction equation, regression equation) between operation data and processing result data. In addition, the analysis processing section 208 constitutes means for predicting the processing result (e.g., apparatus condition such as thickness of top electrode 104, process characteristic data such as etching shape of processed wafer) based on the correlation. The multivariate analysis result storage section 210 constitutes means for storing the correlation found by the analysis processing section 208.

The multivariate analyzer 200 may be composed of a microprocessor, which is operated based on programs from the multivariate analysis program storage section 206, for example. The forgoing operation data storage section 202, processing result data storage section 204 and multivariate analysis result storage section 210 may be composed of recording means such as memory, respectively, or providing the respective memory region to the recording means such as hard disk.

In the multivariate analyzer 200, when the operation data and the processing result data are inputted, they are individually stored in the operation data storage section 202 and the processing result data stage section 204. Thereafter, these data and the program of the multivariate analysis program storage section 206 are captured in the analysis processing section 208. The analysis processing section 208 makes multivariate ants based on the operation data and the processing result data. Thereafter, the multivariate analysis result is stored in the multivariate analysis result storage section 210.

Here, the operation data means detection data obtained from several measurement devices addition attached to the plasma processing apparatus 100 when the wafer W is processed. The processing result data means apparatus condition data relevant to the state of the press chamber 101 obtained by plasma processing and process characteristic data relevant to wafer W. In this case, the following parameter is given as the apparatus condition data. It is consumption data of consumption component after wafer process, that is, thickness of parts in the process chamber 101. In addition, the following parameter is given as the process characteristic data. It is shape data of processed wafer surface obtained after wafer process. The operation data is intermittently measured during processing of the wafer W, on the other hand, the processing result data is measured as the need arises after the wafer process. The foregoing measurement results are individually stored in the storage sections 202 and 204.

In the embodiment since the correlation between the operation data and the processing result data is found, it is preferable to use data readily affected to the processing result as the operation data. According to the embodiment, electrical data is used as the operation data. The following parameters are used as the electrical data. The parameters are fundamental wave applied to the bottom electrode 102, current (I) of integer multiple wave, phase (P), voltage (V) and impedance (Z). In the embodiment, 2 MHz high-frequency power is applied to the bottom electrode 102. In this case, integer multiple waves (e.g., 4 MHz, 8 MHz, 10 MHz) using 2 MHz as the fundamental wave are formed and applied to the bottom electrode 102, in addition to the foregoing 2 MHz high-frequency power.

It can be seen that current and voltage between the matching device 107A of the high frequency supply line and the process chamber 101 vary. In this case, these current and voltage vary in accordance with a change of environment in the process chamber 101, for example, formation or growth of deposited film and consumption of consumed parts.

According to the embodiment, the consumption of the consumed part, for example, top electrode 104 (e.g., thickness of the top electrode 104) is predicted using current and voltage variations. In the embodiment, multivariate analysis is made using the operation data improving prediction accuracy, which is selected from electrical data collected as the operation data. The method of selecting the operation data used for the multivariate analysis will be described later.

In the embodiment, the following parameter is used as the processing result data. For example, the thickness of the top electrode 104 is used as apparatus condition data. More specifically, plasma processing, for example, etching is carried out with respect to a silicon oxide film (e.g., $SiO_2$ film) formed on a wafer using a resist layer as a mask. Wafers W are etched, and thereafter, the thickness of the top electrode 104 is detected, and the detection result is stored as processing result data in the processing result data so section 204.

(Operation Data Selection Based on Principal Component)

The following is an explanation about the method of selecting the operation data used for prediction from the operation data. The analysis processing section 208 makes, for example, a principal component analysis as the multivariate analysis, and selects data based on the analysis result (operation data selecting means, operation data selecting step). For example, if K-th detection values x exist as the operation data with respect to each of the number of N-th wafers W, a matrix X of the operation data is expressed by the following equation (1-1).

[Equation 1]

$$X = \begin{bmatrix} x_{11} & x_{12} & \cdots & x_{1K} \\ x_{21} & x_{22} & \cdots & x_{2K} \\ \vdots & \vdots & \vdots & \vdots \\ x_{NI} & x_{N2} & \cdots & x_{NK} \end{bmatrix} \quad (1\text{-}1)$$

The analysis processing section 208 determines mean, maximum, minimum and variance values based on the foregoing detection values. Thereafter, the analysis processing section 208 makes a principal component analysis of several operation data using a variance-covariance matrix based on the calculated values to determine eigenvalue and eigenvector.

The eigenvalue means the magnitude of variance of the operation data, and is expressed as first, second, . . . a-th component in the magnitude order of eigenvalue. The eigenvalues each have attributive eigenvector (loading level). Usually, the higher the order of the principal component is, the lower proportion with respect to data evaluation becomes. For his reason, the available worth is low.

For example, K-th detection values are employed as the operation data with respect to the number of N wafers. In this case, the a-th principal component score corresponding to the a-th eigenvalue of the n wafer is expressed by the following equation (1-2).

$$t_{na} = x_{n1}p_{1a} + x_{n2}p_{2a} + \ldots + x_{nK}p_{Ka} \quad (1\text{-}2)$$

A vector (score vector) $t_a$ of the a-th principal component score and a matrix (score matrix) $T_a$ thereof are defined by the following equation (1-3). An eigenvector (loading level) $p_a$ of the a-th principal component score and a matrix (loading matrix) $P_a$ thereof are defined by the following equation (1-4). The vector $t_a$ of the a-th principal component score is expressed by the following equation (1-5) using the matrix X and the eigenvector $p_a$. When vectors $t_1$ to $t_K$ of the principal component score and their eigenvectors $p_1$ to $p_K$ are used, the matrix X is expressed by the following equation (1-6). In the equation (1-6), $P_K^T$ is a transposed matrix of $P_K$.

$$t_a = \begin{bmatrix} t_{1a} \\ t_{2a} \\ \vdots \\ t_{Na} \end{bmatrix}, T_a = \begin{bmatrix} t_{11} & t_{12} & \cdots & t_{1a} \\ t_{21} & t_{22} & \cdots & t_{2a} \\ \vdots & \vdots & \vdots & \vdots \\ t_{N1} & t_{N2} & \cdots & t_{Na} \end{bmatrix} (a = 1, 2, \ldots, K) \quad (1\text{-}3)$$

$$P_j = \begin{bmatrix} P_{j1} \\ P_{j2} \\ \vdots \\ P_{jn} \end{bmatrix} (j = 1, 2, \ldots, n) \quad (1\text{-}4)$$

$$t_a = Xp_a \quad (1\text{-}5)$$

$$X = T_K P_K^T = t_1 p_1^T + t_2 p_2^T + \ldots + t_K p_K^T \quad (1\text{-}6)$$

Each component of the loading vector $P_j$ shown in the equation (1-4) is equivalent to each parameter loading of the operation data. The parameter loading is plotted in the graph taking individual principal component axes. It is determined whether or not a variable corresponding to the loading is selected in accordance with the distance from each principal component axis to the loading.

The method of selecting data used for prediction will be detailedly described. The following parameters are given as the operation data. For example, fundamental wave applied to the bottom electrode 102, current (I) of integer multiple wave, phase (P), voltage (V) and an observed value of impedance (Z) are used as electrical data. The following waves are used as the integer multiple waves using 2 MHz as the fundamental wave are as follows. The waves are second, third, fourth, fifth, sixth and seventh harmonic waves of 4 MHZ, 6 MHz, 8 MHz, 10 MHZ, 12 MHz and 14 MHz, tenth harmonic wave of 20 MHz and 20th harmonic wave of 40 MHz.

For example, when the fundamental wave of 2 MHz is given, current (I), phase (P), voltage (V) and impedance (Z) parameters are shown as I_2, P_2, V_2, and Z_2. When the second harmonic wave of 4 MHz is given, current (I), phase (P), voltage (V) and impedance (Z) parameters are shown as I_4, P_4, V_4, and Z_4.

A principal component analysis is made with respect to the foregoing operation data, and two, that is, first and second principal components $P_1$ and $P_2$ are given as the number of the principal components. In this case, loading values (principal component elements of loading matrix P) of parameters in the electrical data are as shown in FIG. 3. Loading parameters of the electrical data is plotted taking the first principal component axis P [1] as the abscissa (horizontal axis) and taking the second principal component as P [2] as the ordinate (vertical axis). By doing so, a graph shown in FIG. 4 is obtained.

Figure 4:
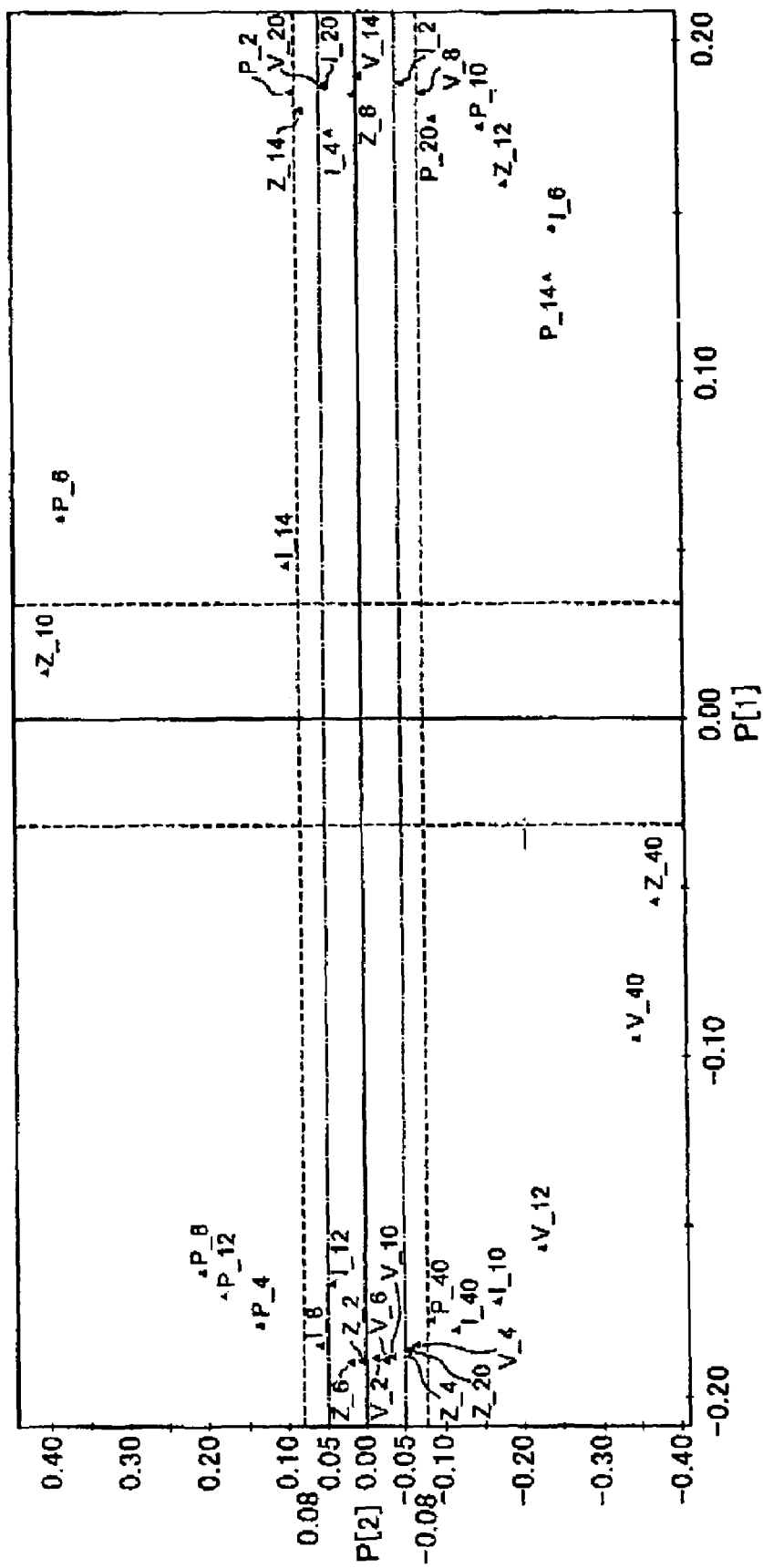
FIG. 4 is a chart plotting each parameter loading values of electrical data in the embodiment taking a first principal component axis P [1] as the ordinate while taking a second principal component axis P [2] as the abscissa.

In FIG. 4, a range from each principal component axis to a predetermined distance is set, and thereafter, parameters corresponding to loading included in the range are selected. For example, a range from the first principal component axis P [1] to ±0.03 shown by the dotted line is set. In this case, the impedance (Z_10) of the fifth harmonic wave of 10 MHz in the range is selected, on the other hand, the phase (P_6) of the third harmonic wave of 6 MHz is not selected because it is out of the range. In addition, a range from the second principal component axis P [2] to ±0.08 shown by the dotted line is set. In this case, voltage (V_2) and impedance (Z_2) of the fundamental wave of 2 MHz in the range are selected, on the other hand, the current (I_14) of the seventh harmonic wave of 14 MHz is not selected because it is out of the range.

As described above, the range from each principal component axis to the predetermined distance is set, and loading parameters included in the range are selected. Data used for prediction is selected from electrical data collected in the manner described above, and thereby, prediction accuracy is improved. In other words, the shorter the distance from a certain principal component axis to loading is, the higher contribution to the principal component axis the loading parameter has. Thus, the distance from each principal component axis is set shorter, and thereby, it is possible to select parameters having high prediction accuracy.

However, as seen from the experimental result described later, the number of parameters used for prediction, that is, the number of electrical data is too limited, and thereby, prediction accuracy is worsened. Thus, it is preferable to set the distance from each principal component axis so that the highest prediction accuracy is obtained.

For example, the distance from each principal component axis is set gradually short, and the range may be narrowed down to select parameters of proper electrical data. The distance from each principal component axis capable of obtaining the highest prediction accuracy is set based on selected data. Thereafter, actual prediction is made using loading parameters included in the range. By doing so, it is possible to properly set the distance from each principal component axis, Concretely, the experimental result predicted after selecting the operation data will be described later.

(Prediction Based on Partial Least Squares Method)

In the embodiment, the multivariate analyzer 200 finds the following related equation (2-1) (prediction equation such as regression equation, model) using multivariate analysis programs. In the equation (2-1), several kinds of operation data are set as explanatory variate (explanatory variable), and processing result data is set as explained variate (dependent variate, dependent variable). In the following regression equation (2-1), X means a matrix of the explanatory variate, and Y means a matrix of the dependent explanatory variate. In addition, B is a regression matrix comprising coefficient (weight) of the explanatory variate, and E is a residual matrix.

$$Y = BX + E \quad (2)$$

According to the embodiment, PLS (Partial Least Squares) method described in, for example, JOURNAL OF CHEMOMETRICS, Vol. 2 (PP211–228)(1198) is employed in order to find the equation (2-1). According to the PLS method, even if matrixes X and Y individually have many explanatory variates and explained variables, some observed values are obtained, and thereby, the related equation of X and Y is found. In addition, the PLS method has high stability and reliability even if the related equation is obtained from some observed values.

The multivariate analysis program storage section 206 stores program for the PLS method. The analysis processing section 208 analyzes both operation data and processing result data according to the program procedure to find the foregoing equation (2-1). Thereafter, the result analysis processing section 208 stores the result in the multivariate analysis result storage section 210. Thus, in the first embodiment, the equation (2-1) is found, and thereby, the operation data is applied as explanatory variate to the matrix X. By doing so, it is possible to predict the processing result. The predicted value has high reliability.

For example, the i-th principal component corresponding to the i-th eigenvalue is expressed as $t_i$ with respect to a matrix $X^T Y$. In this case, a matrix X is expressed by the following equation (2-2) using the i-th principal component score $t_i$ and vector pi. A matrix Y is expressed by the following equation (2-3) using the i-th principal component score $t_i$ and vector $C_i$. In the equations (2-2) and (2-3), $X_{i+1}$ and $Y_{i+1}$ are X and Y residual matrixes, respectively. $X^T$ is a transposed matrix of the matrix X. In the follow description, the index number T means the transposed matrix.

$$X = t_1 p_1 + t_2 p_2 + t_3 p_3 + \ldots + t_i p_i + X_{i+1} \quad (2\text{-}2)$$

$$Y = t_1 c_1 + t_2 c_2 + t_3 c_3 + \ldots + t_i c_i + Y_{i+1} \quad (2\text{-}3)$$

Therefore, the PLS method used in the first embodiment is a method of calculating several eigenvalues and their vectors with less calculation when the foregoing equations (2-2) and (2-3) are correlated.

The PLS method is carried out according to the following procedure. In the first stage, centering and scaling of the matrixes X and Y are carried out The following setting of i=1 is made, and thus, $X_1 = X$, $Y_1 = Y$. The first column of the matrix $Y_1$ is set as $u_1$. The foregoing centering means a process of subtracting the mean of each row from the value thereof. On the other hand, the foregoing scaling means a process of dividing the value of each row by standard deviation thereof.

In the second stage, $w_1 = X_i^T u_i / (u_1^T u_i)$ is found, and thereafter, the matrix equation $w_i$ is normal to find $t_i = X_i w_i$. The same process as described above is carried out with respect to the matrix Y. Then, $c_1 = Y_i^T t_i / (t_1^T t_i)$ is found, and thereafter, the matrix equation $c_i$ is normalized to find $u_i = Y_i c_i / (c_i^T c_i)$.

In the third stage, X loading (load) $p_i = X_i^T t_i / (t_i^T t_i)$ and Y loading $q_1 = Y_i^T u_i / (u_1^T u_i)$ are found. Then, u is regressed as t to find $b_1 = u_i^T t_i / (t_1^T t_i)$. The following residual matrixes $X^i = X_i - t_i p_i^T$ and $Y_i = Y_i - b_i t_i c_i^T$ are found. Then, i is incremented to set i=i+1, the process from the second stage is repeated. The series of processes is repeated until predetermined stop condition is satisfied according to the program of the PLS method, or the residual matrix $X_{i+1}$ is focused to zero. By doing so, the maximum eigenvalue and its eigenvector of the residual matrix are found.

According to the PLS method, stop condition or focusing to zero is quickly satisfied in the residual matrix $X_{i+1}$. Therefore, ten-time calculations are merely repeated, and thereby, stop condition or focusing to zero is satisfied in the residual matrix. In general, four- or five-time calculations are repeated, and thereby, stop condition or focusing to zero is satisfied in the residual matrix. The first principal component of the matrix $X^T Y$ is found using the maximum eigenvalue and eigenvector obtained by the calculation described above. By doing so, it is possible to find the maximum correlation between the matrixes X and Y.

(Operation of Plasma Pressing Apparatus)

The Operation of the plasma processing apparatus 100 will be described below. In the embodiment, the foregoing equation (2-1) for prediction is found by multivariate analysis, for example, partial least squares method using operation data select by the principal component analysis. Thereafter, a predetermined wafer W is processed. In the processing stage of the wafer W, the operation data at an arbitrary time point is applied to the equation (2-1). By doing so, it is possible to predict the processing result (e.g., condition of plasma processing apparatus 100, state of wafer W) at that time.

When the operation of the plasma processing apparatus 100 is stated, the support member 103 is moved down to the lower chamber 101B of the process chamber 101 via the ball screw mechanism 112. On the other hand, the wafer W is carried from the port in which the gate valve 106 is released so that it is placed on the bottom electrode 102. The wafer W is carried and thereafter, the gate valve 106 is closed while the exhaust system 119 is actuated to keep the inside of the process chamber 101 at a predetermined degree of vacuum. In this case, He gas is supplied as back gas from the gas introduction mechanism 115 under the condition that the center pressure is 15 Torr and the edge pressure is 40 Torr. By doing so, the heat conduction between wafer W and bottom electrode 102, that is, between electrostatic chuck 108 and wafer W is improved to enhance the cooling efficiency of the wafer W. In addition, the temperature of the top electrode is set to 6° C., the temperature of the bottom electrode is set to 20° C., and the temperature of the sidewall is set to 60° C.

On the other hand, process gas is supplied from the process gas supply system 118. More specifically, $C_5F_8$ gas, $O_2$ gas and Ar gas are supplied at the gas flow rate 29 sccm, 750 sccm and 47 sccm, respectively. In this case, the internal pressure of the process chamber 101 is 25 mT, for example. In this state, 60 MHz high frequency power is applied from the high frequency source 104E to the top electrode 104 at 3300 W, for example. On the other hand, 2 MHz high frequency power is applied from the high frequency source 107 to the bottom electrode 102 at 3800 W, for example. By doing so, process gas plasma is generated to etch the oxide film of the wafer W. After etching is completed, the operation reverse to the carry-in operation is made, and thereby, the processed wafer W is carried out of the process chamber 101. The same processing as described above is repeated with respect to the next wafer W. The same processing is carried out with respect to the predetermined number of wafers, and thereby, a series of process is completed. The following data is collected with respect to a test wafer used for preparing a model by multivariate analysis. For example, a thickness of the top electrode 104 after processing the wafers W is found, and thereafter, the thickness of the top electrode 104 is determined as processing result data. The operation data and the processing result data are stored in the operation data storage section 202 and the processing result data storage section 204 (data collecting means, data collecting step), respectively.

(Prediction when Plasma Processing is Actually Carried Out)

The following is an explanation about the method of predicting the processing result when plasma processing is actually carried out using operation data and processing rest data selected based on the principal component analysis.

First, multivariate analysis is made based on selected operation data and processing result data to find a correlation (the regression equation (2-1) by the PLS method) between the operation data and the processing result data (analysis step, analysis means). In this embodiment, electrical data previously selected based on the principal component analysis is used as the explanatory variable X of the regression equation (2-1) by the PLS method. The regression equation (2-1) by the PLS method is found using the thickness of the top electrode 104 after carrying out etching as the processing result data.

Based on the correlation, processing result is predicted using operating data when wafer is processed except for wafer obtaining the correlation (prediction step, prediction means)

(Experimental Result)

Here, the selection range (predetermined distance form each principal component axis shown by the dotted line in FIG. 4) of the electrical data used for prediction is gradually narrowed. FIG. 5 to FIG. 9 shows the experimental result when the thickness of the top electrode is predicted.

In FIG. 5 to FIG. 9, A is a graph showing a comparison between a predicted value and an observed value in the thickness of the top electrode 104. Here, three kinds of top electrodes 104 having different thicknesses were prepared. Predictive experiment was conducted using data when wafer was etched using the foregoing three top electrodes. More specifically, etching is carried out using the following top electrodes 104. One is a new top electrode 104 having a thickness of 9.98 mm, and another is a used top electrode 104 having a thickness of 9.71 mm. Another is a top electrode 104 getting lifetime and having a thickness of 9.24 mm. In FIG. 5 to FIG. 9, B is a graph showing a correlation between a predicted value and an observed value in the thickness of the top electrode 104.

In the experiment, the predicted value of the thickness of the top electrode 104 was found in the following manner. For example, as shown FIG. 5A, the regression equation (2-1) was found by the PLS method using electrical data and the thickness of the top electrode 104 when 37-th to 66-th wafers were etched as training data. Electrical data when first to 36-th wafers were etched was collected, and thereafter, the data was applied to the regression equation (2-1) to find the predicted value of the thickness of the top electrode 104. In each A of FIG. 5 to FIG. 9, the predicted value and the observed value in the thickness of the top electrode 104 approximately overlapped with each other when 37-th to 66-th wafers were etched. However, this was because the regression equation (2-1) was found using the data on the foregoing wafers.

Figure 5A:
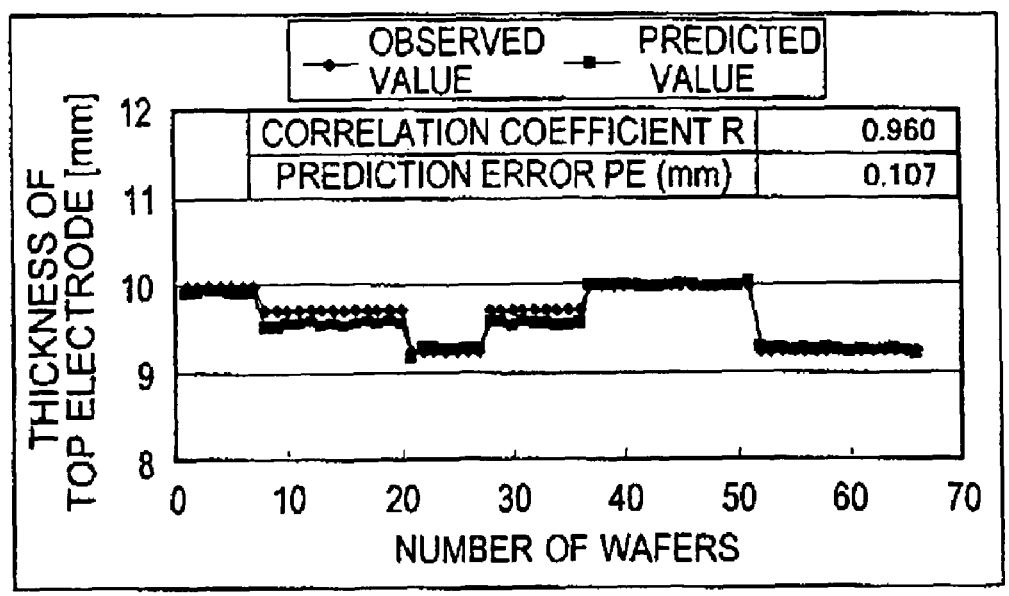
FIG. 5 is a graph to explain an experimental result when prediction is made using all electrical data in the embodiment.
Figure 5B:
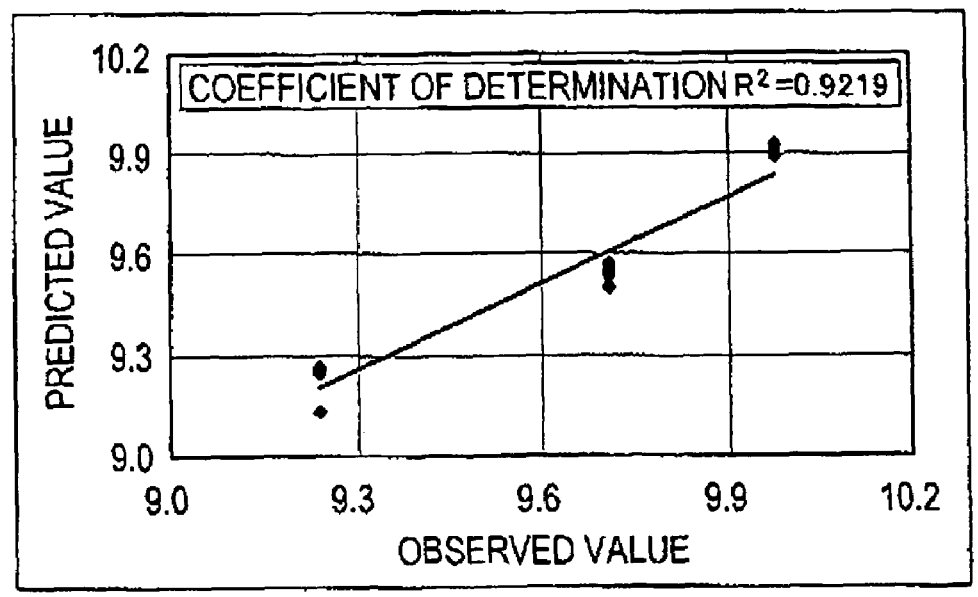

FIG. 5A and FIG. 5B show prediction result using all parameters shown in Table 1 without selecting electrical data. More specifically, the regression equation (2-1) was found by the PLS method using all parameters of collected electrical data (Model No. 1), and the thickness of the top electrode 104 is predicted. In this case, the number of parameters is 36.

TABLE 1

| MODEL NO. 1 [NUMBER OF PARAMETERS = 36] NO SELECT CONDITION | | | |
| --- | --- | --- | --- |
| I_2 | P_2 | V_2 | Z_2 |
| I_4 | P_4 | V_4 | Z_4 |
| I_6 | P_6 | V_6 | Z_6 |
| I_8 | P_8 | V_8 | Z_8 |
| I_10 | P_10 | V_10 | Z_10 |
| I_12 | P_12 | V_12 | Z_12 |
| I_14 | P_14 | V_14 | Z_14 |
| I_20 | P_20 | V_20 | Z_20 |
| I_40 | P_40 | V_40 | Z_40 |

Figure 6A:
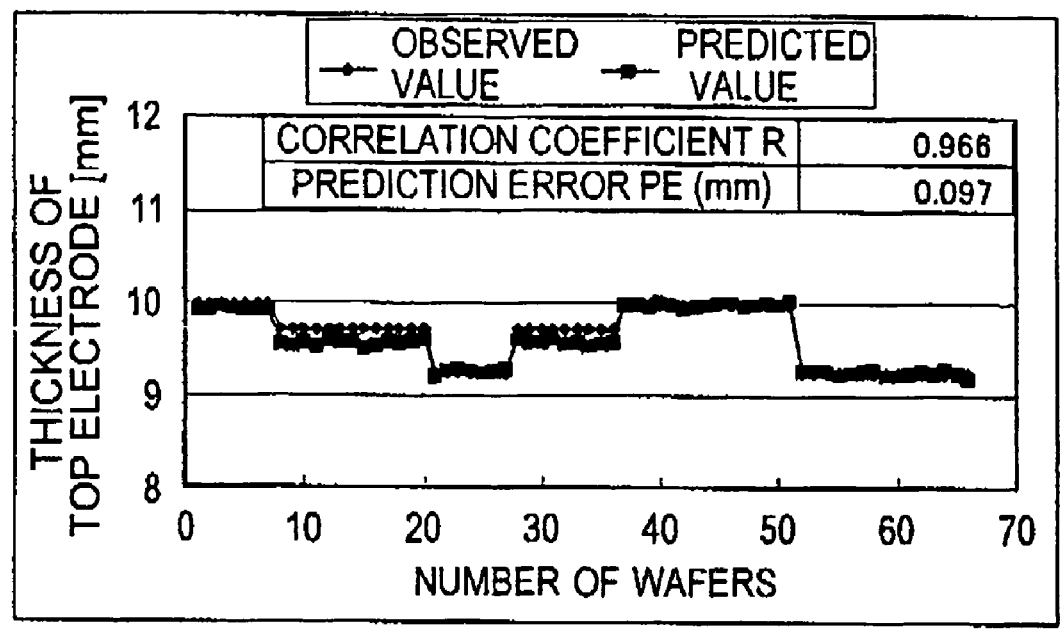
FIG. 6 a graph to explain an experimental result when prediction is made using data selected based on a first select condition of electrical data in the embodiment.
Figure 6B:
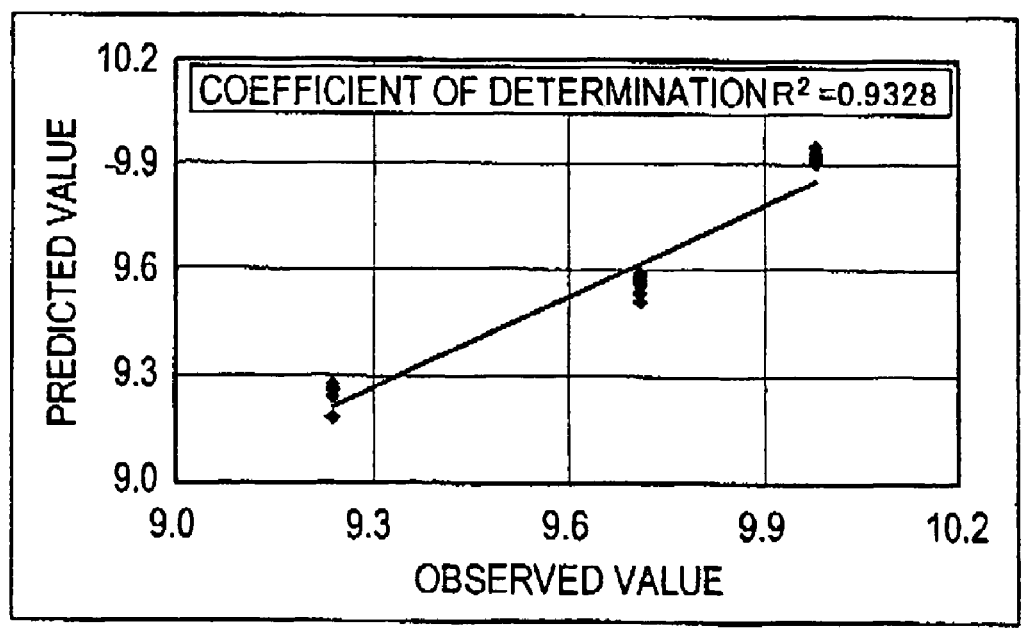

FIG. 6A and FIG. 6B show experiment result obtained in the following manner. The regression equation (2-1) was found by the PLS method using parameters selected based on a first select condition in electrical data. Thereafter, the thickness of the top electrode 104 is predicted. The first select condition was set within a range described below. According to the range, the distance P1 from the first principal component axis P [1] is ±0.03 (in FIG. 4, range shown by the dotted line along the first principal component axis P [1]) in all parameter loading shown in FIG. 4. In addition, the first select condition was set within a range described below. According to the range, the distance P2 from the second principal component axis P [2] is ±0.08 (in FIG. 4, range shown by the dotted line along the second principal component axis P [2]). Loading parameters included in the foregoing select rang were selected, and the regression equation (2-1) was found by the PLS method using the selected parameters (Model No. 2). The number of selected parameters is 18, and the details were shown in Table 2.

TABLE 2

| MODEL NO. 2 [NUMBER OF PARAMETERS = 18] | | |
| --- | --- | --- |
| FIRST SELECT CONDITION | P1 < |0.03| or P2 < |0.08| | |
| I_2 | V_2 | Z_2 |
| I_4 | V_4 | Z_4 |
| I_8 | V_6 | Z_6 |
| I_12 | V_10 | Z_8 |
| I_20 | V_14 | Z_10 |
| — | V_20 | Z_14 |
| — | — | Z_20 |

Figure 7A:
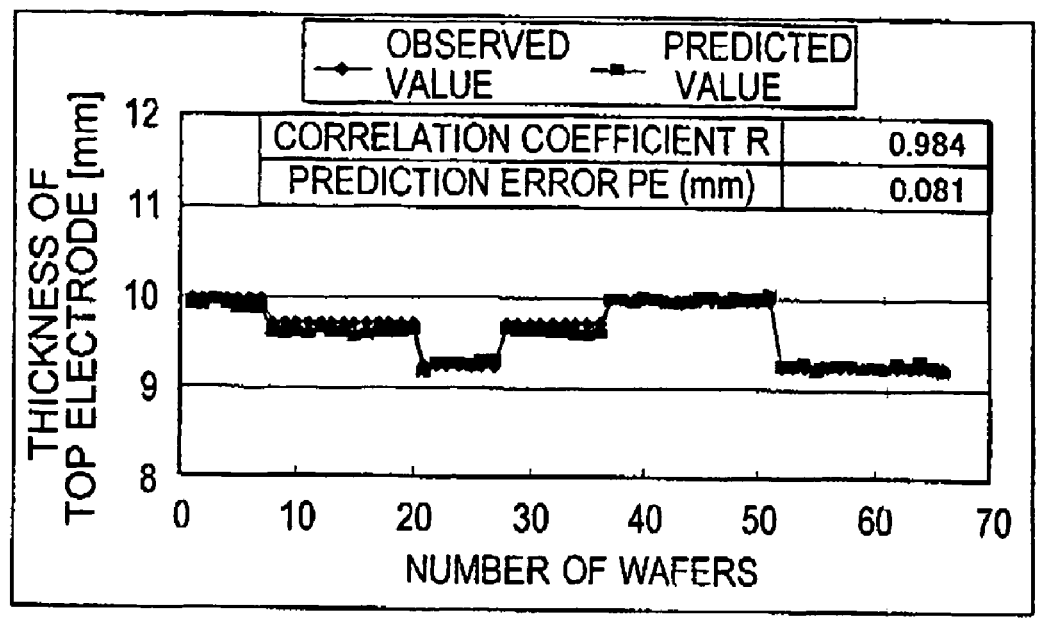
FIG. 7 a graph to explain an experimental result when prediction is made using data selected based on a second select condition of electrical data in the embodiment.
Figure 7B:
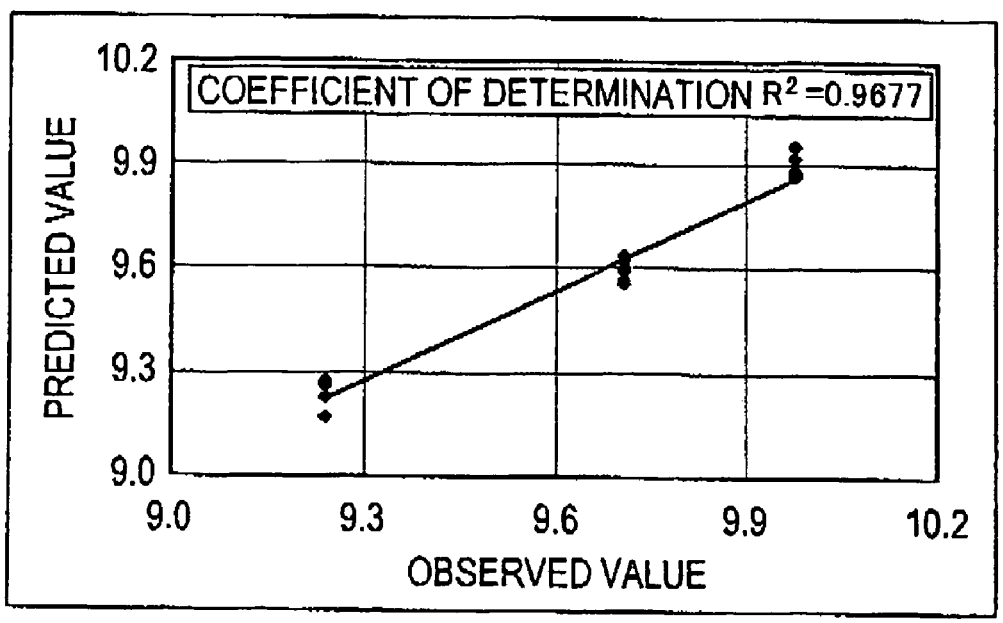

FIG. 7A and FIG. 7B show experiment result obtained in the following manner. The regression equation (2-1) was found by the PLS method using parameters selected based on a second select condition narrower than the first select condition in electrical data. Thereafter, the thickness of the top electrode 104 is predicted. Thee first select condition was set within a range described below. According to the range, the distance P1 from the first principal component axis P [1] is ±0.03 (in FIG. 4, range shown by the dotted line along the first principal component axis P [1]) in all parameter loading shown in FIG. 4. In addition, the fist select condition was set within a range described below. According to the range, the distance P2 from the second principal component axis P [2] is ±0.05 (in FIG. 4, range shown by the dotted chain line along the second principal component axis P [2]). Loading parameters included in the foregoing select range were selected, and the regression equation (2-1) was found by the PLS method using the selected parameters (Model No. 3). The number of selected parameters is 12, and the details were shown in Table 3.

TABLE 3

| MODEL NO. 3 [NUMBER OF PARAMETERS = 12] | | |
| --- | --- | --- |
| SECOND SELECT CONDITION | P1 < |0.03| or P2 < |0.05| | |
| I_2 | V_2 | Z_2 |
| I_12 | V_6 | Z_6 |
| I_20 | V_10 | Z_8 |
| — | V_14 | Z_10 |
| — | V_20 | — |

Figure 8A:
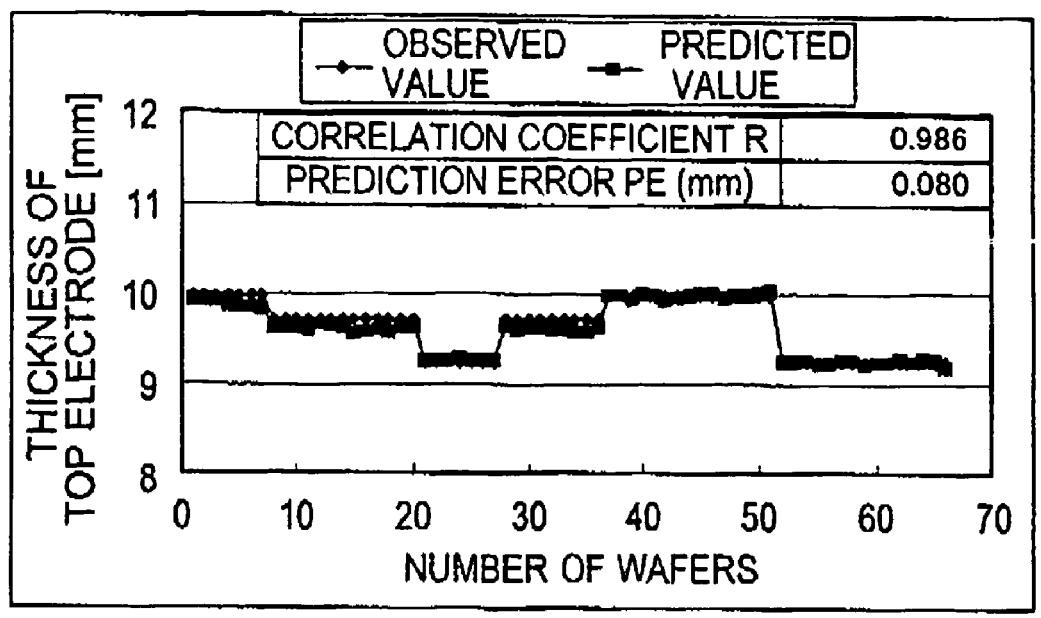
FIG. 8 a graph to explain an experimental result when prediction is made using data selected based on a third select condition of electrical data in the embodiment.
Figure 8B:
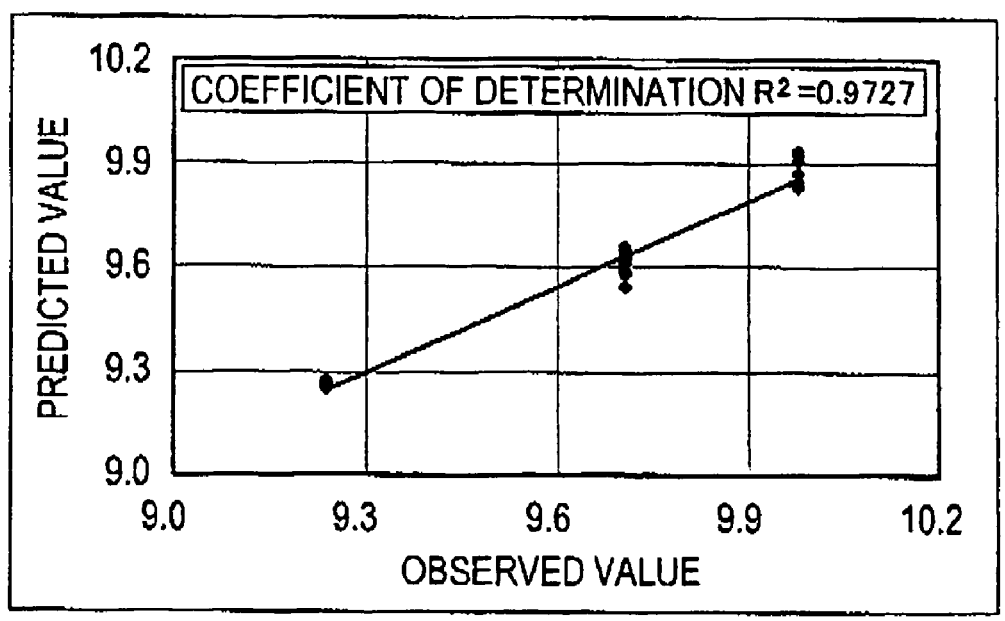

FIG. 8A and FIG. 8B show experiment result obtained in the following manner. The regression equation (2-1) was found by the PLS method using parameters selected based on a third select condition narrower than the second select condition in electrical data. Thereafter, the thickness of the top electrode 104 is predicted. The third select condition was set within a range described below. According to the range, the distance P1 from the first principal component axis P [1] is ±0.03 in all parameter loading shown in FIG. 4. In addition, the third select condition was set within a range described below. According to the range, the distance P2 from the second principal component axis P [2] is ±0.04. Loading parameters included in the foregoing select range were selected, and the regression equation (2-1) was found by the PLS method using the selected parameters (Model No. 4). The number of selected parameters is 9, and the details were shown in Table 4.

TABLE 4

| MODEL NO. 4 [NUMBER OF PARAMETERS = 9] | | |
|---|---|---|
| THIRD SELECT CONDITION | P1 < |0.03| or P2 < |0.04| | |
| I_4 | V_2 | Z_2 |
| — | V_6 | Z_6 |
| — | V_10 | Z_8 |
| — | V_14 | Z_10 |

Figure 9A:
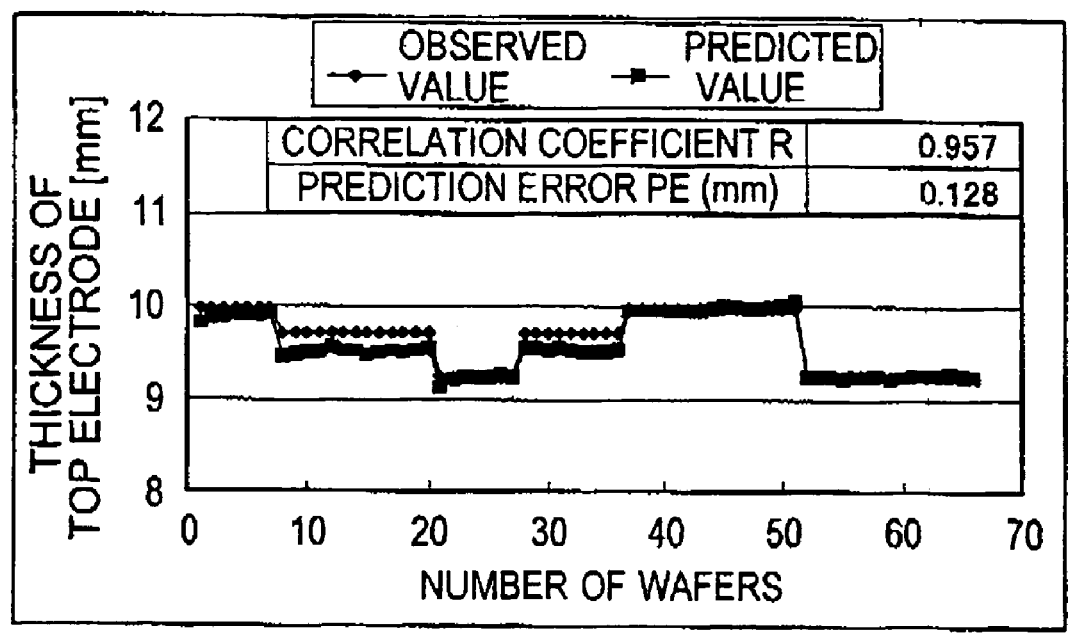
FIG. 9 a graph to explain an experimental result when prediction is made using data selected based on a fourth select condition of electrical data in the embodiment.
Figure 9B:
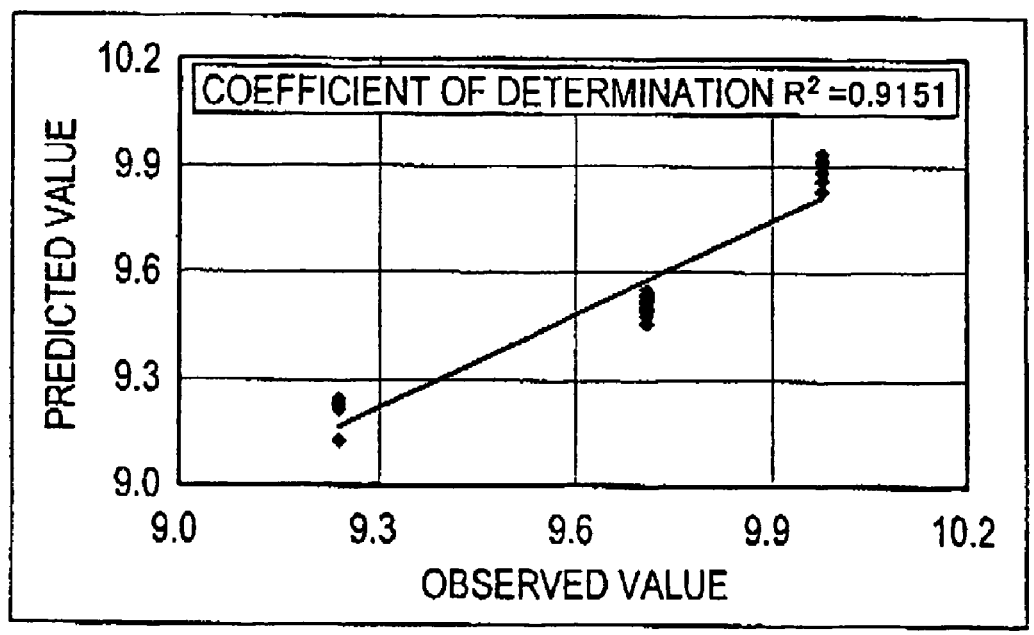

FIG. 9A and FIG. 9B show experiment result obtained in the following manner. The regression equation (2-1) was found by the PLS method using parameters selected based on a fourth select condition narrower than the third select condition in electrical data. Thereafter, the thickness of the top electrode 104 is predicted. The fourth select condition was set within a range described below. According to the range, the distance P1 from the first principal component as P [1] is ±0.03 in all parameter loading shown in FIG. 4. In addition, the fourth select condition was set within a range described below. According to the range, the distance P2 from the second principal component axis P [2] is ±0.03. Loading parameters included in the foregoing select range were selected, and the regression equation (2-1) was found by the PLS method using the selected parameters (Model No. 3). The number of selected parameters is 7, and the details were shown in Table 5.

TABLE 5

| MODEL NO. 5 [NUMBER OF PARAMETERS = 7] | | |
|---|---|---|
| FOURTH SELECT CONDITION | P1 < |0.03| or P2 < |0.03| | |
| — | V_2 | Z_2 |
| — | V_6 | Z_6 |

TABLE 5-continued

| MODEL NO. 5 [NUMBER OF PARAMETERS = 7] | | |
|---|---|---|
| FOURTH SELECT CONDITION | P1 < |0.03| or P2 < |0.03| | |
| — | V_14 | Z_8 |
| — | — | Z_10 |

Prediction error (PE) was calculated with respect to each experiment result of FIG. 5 to FIG. 9. The prediction error (PE) was calculated in the following manner. The predicted value was subtracted from the observed value of the processing result data of each wafer, and thereafter, squared to find the total sum. The obtained result was divided by the number of processed wafers to find the square root. In the prediction error, "0" (zero) is the best value. The smaller the value of the prediction error is, the less the error between the observed value and the predicted value is.

In addition, a correlation coefficient R was calculated with respect to FIG. 5 to FIG. 9. Here, the correlation coefficient R is one of indexes showing the strength in the relation between two variates x and y. In general, a correlation coefficient $R_{xy}$ is expressed by the following equation (3-1).

$$R_{xy} = \frac{S_{xy}}{\sqrt{S_x S_y}} = \frac{\sum (X_i - x)(Y_i - y)}{\sqrt{\sum (X_i - x)^2 (Y_i - y)^2}} \qquad (3\text{-}1)$$

Where, $S_{xy}$ is covariance, and $S_x$ and $S_y$ are standard deviation. In the correlation coefficient R, "1" is the best value. When the value is larger, the correlation is higher.

Further, a coefficient of determination $R^2$ was calculated with respect to FIG. 5 to FIG. 9. The coefficient of determination $R^2$ is one of the standards showing goodness of application to the regression equation, and expressed by the following equation (3-2).

$$R^2 = \frac{S_R}{S_T} = \frac{\sum (Y_i - y)^2}{\sum (y_i - y)^2} \qquad (3\text{-}2)$$

In the equation (3-2), $S_T$ is total variance, and $S_R$ is partial covariance explained in the regression equation. The coefficient of determination $R^2$ takes values satisfying $0 \leq R^2 \leq 1$. In the correlation coefficient R, "1" is the best value. When the value is large, goodness of application to the regression equation is higher. The coefficient of determination $R^2$ is equal to squares of the correlation coefficient R.

The following Table 6 totally shows prediction error PE, correlation coefficient R and coefficient of determination $R^2$ obtained from each experiment result of FIG. 5 to FIG. 9.

TABLE 6

| MODEL [NUMBER OF PARAMETERS] | FIGURE NUMBER | PREDICTION ERROR [PE] | CORRELATION COEFFICIENT R | COEFFICIENT OF DETERMINATION R2 |
|---|---|---|---|---|
| MODEL NO. 1 (36) | FIG. 5 | 0.107 | 0.96 | 0.9219 |
| MODEL NO. 2 (18) | FIG. 6 | 0.097 | 0.966 | 0.9328 |
| MODEL NO. 3 (12) | FIG. 7 | 0.081 | 0.984 | 0.9677 |
| MODEL NO. 4 (9) | FIG. 8 | 0.08 | 0.986 | 0.9727 |
| MODEL NO. 5 (7) | FIG. 9 | 0.128 | 0.957 | 0.9151 |

In short, when the prediction error PE is near to "0", the correlation coefficient R is near to "1", and the coefficient of determination $R^2$ is near to "1", prediction accuracy is high. As seen form the Table 6 considering the foregoing explanation, the value of the prediction error PE becomes gradually small in the order of FIG. 5 to FIG. 8. In addition, both the correlation coefficient R and the coefficient of definition $R^2$ become near to "1". Thus, the prediction accuracy of FIG. 5 to FIG. 8 is improved in sequence. Select conditions for selecting parameters of operation data are strictly set, in other words, the distance from each principal component axis as shown in FIG. 4 is set shorter. By doing so, it can be seen that prediction accuracy becomes higher.

However, the prediction accuracy of FIG. 9 becomes worse as compared with that of FIG. 8 in spite of setting parameters narrower than the case of FIG. 8. This means that there is a tendency for the prediction accuracy to become worse if operation data selected and narrowed based on principal component analysis it too reduced as the embodiment.

Therefore, the distance from each principal component axis is set shorter as the select condition for selecting operation data, and thereby the prediction accuracy is improved. The peak comes when the distance reaches a certain point, and thereafter, there is a tendency for the prediction accuracy to become gradually worse. For this reason, it is desirable to set the predetermined distance (select condition) from each principal component axis so that the prediction accuracy becomes the highest.

For example, a predetermined distance from each principal component axis is set gradually shorter, and prediction is carried out every setting to calculate the foregoing prediction error PE and correlation coefficient R. It is important to find setting before the calculated value of the prediction accuracy becomes worse as compared with the previous case. The setting is used as the predetermined distance from each principal component axis (select condition). By doing so, the predetermined distance form each principal component axis (select condition) can be set so that the prediction accuracy becomes the highest. In this case, the range is narrowed in the sequence of the lower order the principal component. By doing so, the range is narrowed based on the distance from the principal component axis having high contribution to data evaluation. Therefore, the prediction accuracy can be further improved.

Film thickness of sub-products and consumption of parts such as focus ring 110a may be used as apparatus condition data, in addition to the thickness of the top electrode described in the embodiment. The consumption of parts is used as the apparatus condition data. By doing so, it is possible to properly predict the time for cleaning the plasma processing apparatus 100 and the time for replacing parts such as top electrode.

Etching dimension of objects to be processed such the dimension of shape formed by etching may be used as the processing result data. By doing so, the etching dimension taking much time for measurement is predicted with high accuracy, so that the etching dimension is readily monitored. The etching dimension is accurately predicted with respect to the total number of objects to be processed, therefore, monitoring is properly carried out.

Process characteristic data is used as the process result data in place of the apparatus condition data, and thereby, prediction for process characteristic may be earned out. Etching rate data by etching may be used as the process characteristic data. In addition, data relevant to etching such predetermined dimension of the shape formed by etching the wafer W may be used.

In the embodiment, electrical data such as fundamental wave applied to the bottom electrode 102, current (I) of integer multiple wave, phase (P), voltage (V) and impedance (Z) are used as operation data. Other VI probe data, optical data and trace data may be used.

For example, emission spectrum strength of a wave detected from the optical measurement device 120 described above is given as the optical data. The following parameters are given as the trace data. For example, one of the parameters is a gas flow rate measured by each of mass flow controllers 118C, 118F and 118I. Another is an APC opening by the APC valve 101D. Another is an applied current of the electrostatic chuck 108 detected from the wattmeter 109a, and an applied voltage data. Further, another is a gas pressure of backside gas detected by the pressure gage 115B. Another is measurement value in the matching device 107A (e.g., position of variable capacitors C1 and C2 in a matching state, voltage Vdc between high frequency power supply line (electric cable) and ground). Another is measurement value in the electric measurement device (VI probe) 107C (e.g., traveling wave and reflection wave of high frequency power).

The foregoing embodiment has explained about the case where the wafer W is etched. The present invention is applicable to processing apparatuses for deposition other than etching. The object to be processed is not limited to the wafer.

According to the embodiment, the condition of the plasma processing apparatus 100 such as thickness of the top electrode 104 is predicted using operation data selected based on the multivariate analysis result selected from collected operation data. Thus, prediction is carried out in a manner of reducing the operation data without using operation data (e.g., operation data given as noise) giving a bad influence to prediction result. By doing so, the prediction accuracy is improved.

Although the present invention has been described in its preferred embodiment with the accompanying drawings, the invention is not limited to the specific embodiments. It is apparent in those skilled in the art that various changes and modifications may be made in the invention without departing from the scope defined in the appended claims. Therefore, it should be considered to be within the scope of the invention.

For example, the plasma processing apparatus is not limited to a parallel flat type plasma processing apparatus. The present invention is applicable to helicon wave plasma processing apparatus and induction coupled type plasma processing apparatus.

As is evident from the foregoing description, according to the present invention, there is provided prediction apparatus and method for plasma processing apparatus, having the following features. Data used for prediction is selected based on multivariate analysis, and model such as regression equation is prepared using the selected data. Based on the model, prediction is carried out, and thereby, prediction accuracy is improved.

What is claimed is:

1. A prediction apparatus for a plasma processing apparatus, which predicts a condition of the plasma processing apparatus or state of an object to be processed based on an operation data of the plasma processing apparatus and a processing result data acquiring the condition of the plasma processing apparatus or state of the object to be processed as processing result in a process of carrying out plasma processing with respect to the object to be processed in a process chamber of the plasma processing apparatus, comprising:

data collecting means for collecting an operating data and the processing result data;

operation data selecting means for making multivariate analysis with respect to the collected operation data, and selecting the operation data used for prediction based on the analysis result;

analysis means for finding a correlation between the selected operation data and the processing result data; and prediction means for predicting a condition of the plasma processing apparatus or state of the object to be processed using an operation data when objects to be processed other than the object to be processed used for obtaining the correlation are processed, based on the correlation found by the analysis means.

2. The prediction apparatus for a plasma processing apparatus according to claim 1, wherein the operation data selecting means makes a principal component analysis with respect to the collected operation data, and thereafter, selects the operation data based on a relative contribution of the initial operation data relevant to each principal component axis obtained from the principal component analysis.

3. The prediction apparatus for a plasma processing apparatus according to claim 2, wherein the relative contribution of the initial operation data relevant to each principal component axis is loaded relevant to each option data, and an operation data corresponding to loading within a predetermined distance range from each principal component axis is selected.

4. The prediction apparatus for a plasma processing apparatus according to claim 3, wherein the predetermined distance range from each principal component axis is gradually shortened so that prediction is carried out based on an operation data selected in each predetermined distance range, and a distance from each principal component axis is set so that the best prediction result is obtained, and thereafter, the operation data is selected.

5. The prediction apparatus for a plasma processing apparatus according to claim 1, wherein the analysis means finds the correlation using a partial least squares method.

6. The prediction apparatus for a plasma processing apparatus according to claim 1, wherein the operation data includes at least electrical data of a harmonic wave based on plasma generated in the process chamber, and the processing result data is data relevant to consumption of parts arranged in the process chamber.

7. The prediction apparatus for a plasma processing apparatus according to clam 6, wherein the processing result data is data relevant to a thickness of an electrode arranged in the process chamber.

8. A prediction method for a plasma processing apparatus, which predicts a condition of the plasma processing apparatus or state of an object to be processed based on an operation data of the plasma processing apparatus and a processing result data acquiring the condition of the plasma processing apparatus or state of the object to be processed as processing result in a process of carrying out plasma processing with respect to the object to be processed in a process chamber of the plasma processing apparatus, comprising:

a data collecting step of collecting an operating data and the processing result data;

an operation data selecting step of making multivariate analysis with respect to the collected operation data, and selecting the operation data used for prediction based on the analysis result;

an analysis step of finding a correlation between the selected operation data and the processing result data; and a prediction step of predicting a condition of the plasma processing apparatus or state of the object to be processed using an operation data when objects to be processed other than the object to be processed used for obtaining the correlation are processed, based on the correlation found by the analysis step.

9. The prediction method for a plasma processing apparatus according to claim 8, wherein the operation data select step makes a principal component analysis with respect to the collected operation data, and thereafter, selects the operation data based on a relative contribution of the initial operation data relevant to each principal component axis obtained from the principal component analysis.

10. The prediction method for a plasma processing apparatus according to claim 9, wherein the relative contribution of the initial operation data relevant to each principal component axis is loaded relevant to each operation data, and an operation data corresponding to loading within a predetermined distance range from each principal component axis is selected.

11. The prediction method for a plasma processing apparatus according to claim 10, wherein the predetermined distance range from each principal component axis is gradually shortened so that prediction is carried out based on an operation data selected in each predetermined distance range, and a distance from each principal component axis is set so that the best prediction result is obtained; and thereafter, the operation data is selected.

12. The prediction method for a plasma processing apparatus according to claim 8, wherein the operation step finds the correlation using a partial least squares method.

13. The prediction method for a plasma processing apparatus according to claim 8, wherein the operation data includes at least electrical data of a harmonic wave based on plasma generated in the process chamber, and the processing result data is data relevant to consumption of as arranged in the process chamber.

14. The prediction method for a plasma processing apparatus according to claim 13, wherein the processing result data is data relevant to a thickness of an electrode arranged in the process chamber.

* * * * *

UNITED STATES PATENT AND TRADEMARK OFFICE
CERTIFICATE OF CORRECTION

PATENT NO.        : 7,263,463 B2                                   Page 1 of 1
APPLICATION NO. : 10/841570
DATED             : August 28, 2007
INVENTOR(S)       : Yoshihiro Yamazaki It is certified that error appears in the above-identified patent and that said Letters Patent is hereby corrected as shown below:

In claim 7, column 19, line 53, "clam" should read --claim--.

In claim 13, column 20, line 52, "as" should read --parts--.

Signed and Sealed this

Twentieth Day of November, 2007

JON W. DUDAS
*Director of the United States Patent and Trademark Office*